United States Patent
Park et al.

(10) Patent No.: US 7,477,728 B2
(45) Date of Patent: Jan. 13, 2009

(54) FAST VOICE DIALING APPARATUS AND METHOD

(75) Inventors: Hee-seon Park, Seoul (KR); Chang-dae Bang, Seoul (KR); Ho-chul Shin, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 554 days.

(21) Appl. No.: 10/406,608

(22) Filed: Apr. 4, 2003

(65) Prior Publication Data

US 2004/0018856 A1 Jan. 29, 2004

(30) Foreign Application Priority Data

May 25, 2002 (KR) .............................. 2002-29119

(51) Int. Cl.
H04M 1/64 (2006.01)
(52) U.S. Cl. .............................. 379/88.03; 379/216.01; 379/355.05
(58) Field of Classification Search . 379/355.01–355.1, 379/88.03, 216.01
See application file for complete search history.

(56) References Cited

U.S. PATENT DOCUMENTS

| | | | | |
|---|---|---|---|---|
| 5,042,063 A * | 8/1991 | Sakanishi et al. | ........ | 379/88.03 |
| 5,204,894 A * | 4/1993 | Darden | ..................... | 379/88.03 |
| 5,568,546 A * | 10/1996 | Marutiak | ................ | 379/355.05 |
| 5,912,949 A * | 6/1999 | Chan et al. | ............... | 379/88.03 |
| 6,098,040 A * | 8/2000 | Petroni et al. | ................ | 704/234 |
| 6,208,713 B1 * | 3/2001 | Rahrer et al. | .............. | 379/67.1 |
| 6,226,532 B1 * | 5/2001 | Kim et al. | .................... | 455/563 |
| 6,320,943 B1 * | 11/2001 | Borland | .................. | 379/112.01 |
| 6,442,270 B1 * | 8/2002 | Simon et al. | ........... | 379/355.09 |
| 6,567,675 B1 * | 5/2003 | Rosen et al. | ................. | 455/564 |
| 6,608,895 B1 * | 8/2003 | Avidan | ................... | 379/355.01 |
| 6,697,455 B2 * | 2/2004 | Krofchalk | ................ | 379/88.03 |
| 6,766,017 B1 * | 7/2004 | Yang | ..................... | 379/355.02 |
| 6,980,642 B1 * | 12/2005 | Hung et al. | ............ | 379/355.05 |
| 7,103,168 B2 * | 9/2006 | Bedingfield et al. | ..... | 379/219.01 |
| 2002/0003867 A1 * | 1/2002 | Rothschild et al. | ........ | 379/88.01 |

FOREIGN PATENT DOCUMENTS

| | | |
|---|---|---|
| JP | 04-192852 A | 7/1992 |
| JP | 5-41249 | 6/1993 |
| JP | 05-244243 | 9/1993 |
| JP | 08-314495 | 11/1996 |
| JP | 2000-032108 | 1/2000 |

* cited by examiner

*Primary Examiner*—Fan Tsang
*Assistant Examiner*—Simon Sing
(74) *Attorney, Agent, or Firm*—Sughrue Mion, PLLC (57) ABSTRACT

In a fast, convenient voice dialing apparatus and method, users efficiently and conveniently apply a telephone number digit recognition engine to number dialing. By voicing only a subset of a telephone number among telephone numbers pre-registered in a telephone number directory, the success rate of number dialing and convenience of users increases. The voice dialing apparatus includes a fast voice dial mode setting unit, a contracted number database, a contracted number detection unit, and a telephone number connection unit. Since a user only needs to voice a subset of a telephone number stored in a telephone number directory, long telephone numbers are dialed with better recognition performance at an improved speed. Since telephone numbers that users try to call are pre-stored in a telephone number directory, the number of combinable numbers equals the number of lists registered in the telephone number directory, and recognition speed and performance are improved.

47 Claims, 10 Drawing Sheets

FAST VOICE DIALING APPARATUS AND METHOD

BACKGROUND OF THE INVENTION

This application claims the priority based on Korean Patent Application No. 2002-29119, filed on May 25, 2002, in the Korean Intellectual Property Office, the disclosure of which is incorporated herein in its entirety by reference.

1. Field of the Invention

The present invention relates to a fast, convenient voice dialing apparatus and method by which users can efficiently and conveniently apply a telephone number digit recognition engine to number dialing.

2. Description of the Related Art

Related art voice dialing techniques include the following methods: a talker-dependent voice recognition method in which a user speaks voice-registered names; a talker-independent voice recognition method in which a user speaks the name of a person stored in a telephone number directory; and a method in which a user speaks each of the digits of a telephone number. To achieve a convenient telephone connection using mobile phones, the related art talker-independent voice recognition engine, which does not need a voice registration process, is preferred to the related art talker-dependent voice recognizer, which needs voice registration.

In the case of the above related art method in which the user speaks telephone number digits, different lengths of telephone numbers cause very different degrees of recognition accuracy. If a wrong digit appears due to a wrong recognition in the middle of voice dialing, only the wrong digit must be corrected, which causes inconvenience to a user. To correct only the wrong digit, the user must carefully watch a LCD, move the cursor to the place of the wrong digit, and then voice the correct digit or alternatively, press an appropriate digit key. No matter how many digits are wrong, the wrong digit(s) can also be corrected by re-voicing the whole telephone number digits. However, each of these methods causes inconveniences to the user.

Since a voice recognizer cannot know where a voicing error has occurred and how serious the voicing error is, even if a user re-voices the telephone number, the probability of correctly voicing the whole telephone number digits is no greater than as before. Also, since the number of telephone number digits that can be remembered by a user is limited, telephone numbers with 7 or more digits are hard to be voiced, and it is not effective to voice frequently-used telephone numbers. Furthermore, since a voice recognition engine can produce an excessively large number of digit strings, recognition speed and performance are degraded.

When a related art telephone number digit string composed of 7 digits or more is voiced according to the conventional telephone number digit voicing method, a voice recognition engine cannot effectively recognize the long digit string. As a result, the user is inconvenienced when voicing the digits of the long telephone number. Particularly, if a recognition result was wrong because of noise or other factors generated during recognition, the user must re-voice the telephone number that has already been voiced, which is ineffective.

Also, if a user remembers a telephone number registered in a telephone number directory but does not remember the person's name corresponding to the telephone number, the related art talker-independent voice recognition method cannot be used.

SUMMARY OF THE INVENTION

The present invention provides a fast voice dialing apparatus and method in which a telephone number that a user wants to call can be dialed by voicing only a part (e.g., four rear digits) of the telephone number instead of voicing all digits of the telephone number.

According to an aspect of the present invention, there is provided a fast voice dialing apparatus including a fast voice dial mode setting unit, a contracted number database, a contracted number detection unit, and a telephone number connection unit. The fast voice dial mode setting unit sets a fast voice dial mode if a command for a fast voice dial mode to be set is received from a user. The contracted number database stores and manages telephone numbers used by the user and establishing a contracted number list using contracted numbers extracted from the telephone numbers. The contracted number detection unit detects a contracted number voiced by the user from the contracted number list of the contracted number database when the fast voice dial mode is set in the fast voice dial mode setting unit. The telephone number connection unit connects the detected contracted number to a telephone number corresponding to the detected contracted number.

A fast voice dialing apparatus is provided, including a fast voice dial mode setting unit that sets a fast voice dial mode in response to a user-generated command for setting a fast voice dial mode, and a contracted number database that stores and manages a plurality of telephone numbers, establishes a contracted number list using a plurality of contracted numbers extracted from corresponding ones of the telephone numbers. Additionally, a contracted number detection unit detects a contracted number generated by a signal produced by the user from the contracted number list of the contracted number database when the fast voice dial mode is set in the fast voice dial mode setting unit, and a telephone number connection unit connects the detected contracted number to a telephone number corresponding to the detected contracted number.

Also, a fast voice dialing method is provided, including the steps of setting a fast voice dial mode when a user generates a command for setting a fast voice dial mode, and storing and managing a plurality of telephone numbers used by the user and establishing a contracted number list using a plurality of contracted numbers extracted from the telephone numbers. The method also includes the steps of detecting a user-generated contracted number from the contracted number list when the fast voice dial mode is set, and connecting the detected contracted number to a telephone number corresponding to the detected contracted number.

Further, a fast voice dialing apparatus includes a fast voice dial mode setting unit that sets a fast voice dial mode when a user generates a command for setting a fast voice dial mode, a contracted number detection unit that detects a contracted number generated by the user from a telephone number list in the telephone number database when the fast voice dial mode is set in the fast voice dial mode setting unit, and a telephone number connection unit connecting the detected contracted number to a telephone number corresponding to the detected contracted number, wherein the apparatus has no contracted number database.

Additionally, a fast voice dialing method is provided that includes setting a fast voice dial mode when a command for a fast voice dial mode to be set is received from a user, detecting a contracted number voiced by the user from a telephone number list in a telephone number database if the fast voice dial mode is set, and connecting the detected contracted number to a telephone number corresponding to the detected contracted number, wherein a contracted number database is not used.

A computer readable recording medium on which a computer program having a set of instructions for executing fast telephone dialing is also provided, the instructions including setting a fast voice dial mode when a user generates a command for setting a fast voice dial mode, and storing and managing a plurality of telephone numbers used by the user and establishing a contracted number list using a plurality of contracted numbers extracted from the telephone numbers. The instructions also include detecting a user-generated contracted number from the contracted number list when the fast voice dial mode is set, and connecting the detected contracted number to a telephone number corresponding to the detected contracted number.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 1:
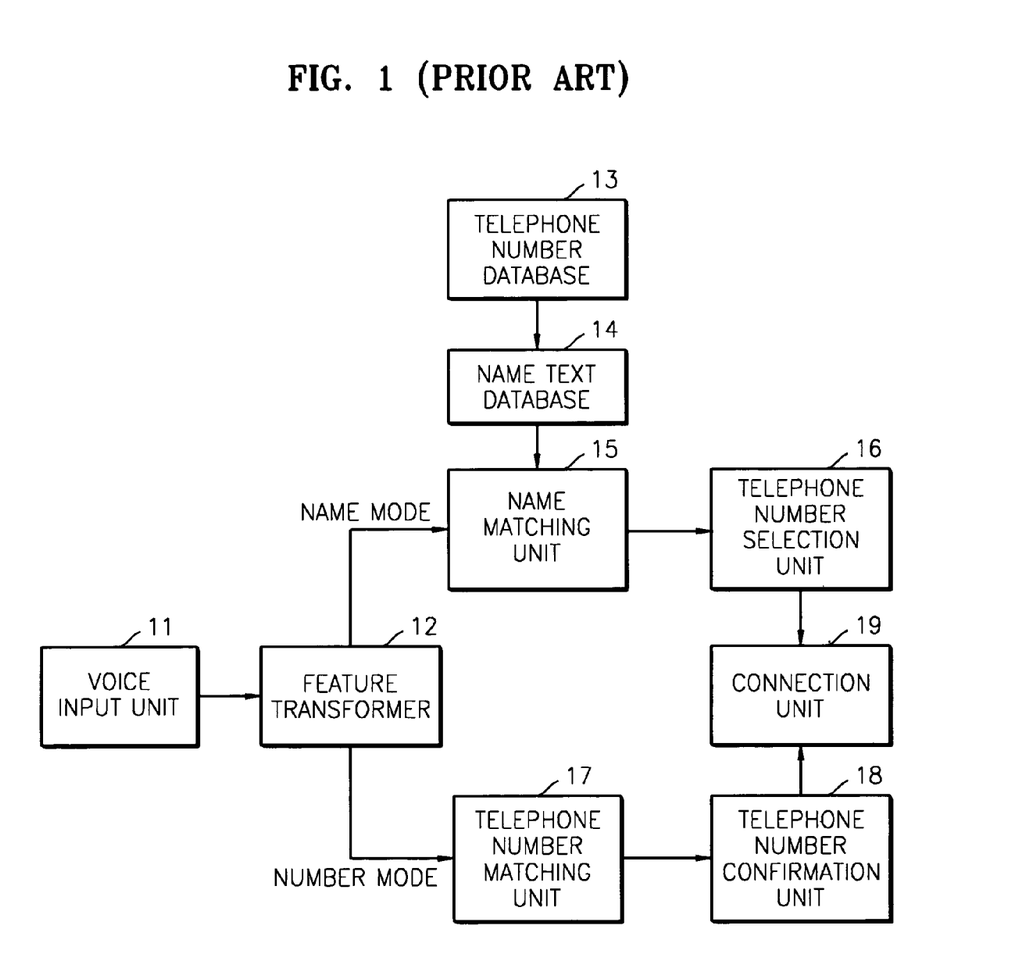
FIG. 1 is a block diagram of a related art voice dialing apparatus.

FIG. 1 is a block diagram of a related art voice dialing apparatus. When a user speaks, a voice input unit 11 sets a voice dialing mode in response to the user's voice. A feature transformer 12 transforms the voice received from the voice input unit 11 into a feature vector using a codec. If a name mode is set, a name matching unit 15 pattern-matches the feature vector with a model sequence that includes texts stored in a telephone number directory. The model sequence is stored and managed by a name text database 14, which includes only names extracted from the telephone number database 13. A telephone number selection unit 16 selects a telephone number corresponding to a name recognized by the name matching unit 15. A connection unit 19 dials the selected telephone number.

If the voice input unit 11 sets a number mode, a telephone number matching unit 17 pattern matches the input feature vector with a model for a number sound re-constructed according to predetermined grammar. A telephone number confirmation unit 18 confirms a telephone number output from the telephone number matching unit 17. Then, the connection unit 19 dials the confirmed telephone number.

In the operation of the related art voice dialing apparatus, first, a user speaks the name or telephone number of a person to be called. Next, the voice signal is transformed into pulse code modulation (PCM) data using a codec, and the PCM data is transformed into a feature vector that can be recognized. Thereafter, if a name mode is set, a target platform (or a mobile phone) acquires a name list from a telephone number directory. On the other hand, if a number mode is set, the target platform acquires a telephone number list from the telephone number directory.

In the name mode, the input feature vector is pattern-matched against a model sequence obtained by re-constructing pre-stored models in accordance with the name list. Then, a telephone number associated with a name obtained by voice recognition is dialed.

Figure 2:
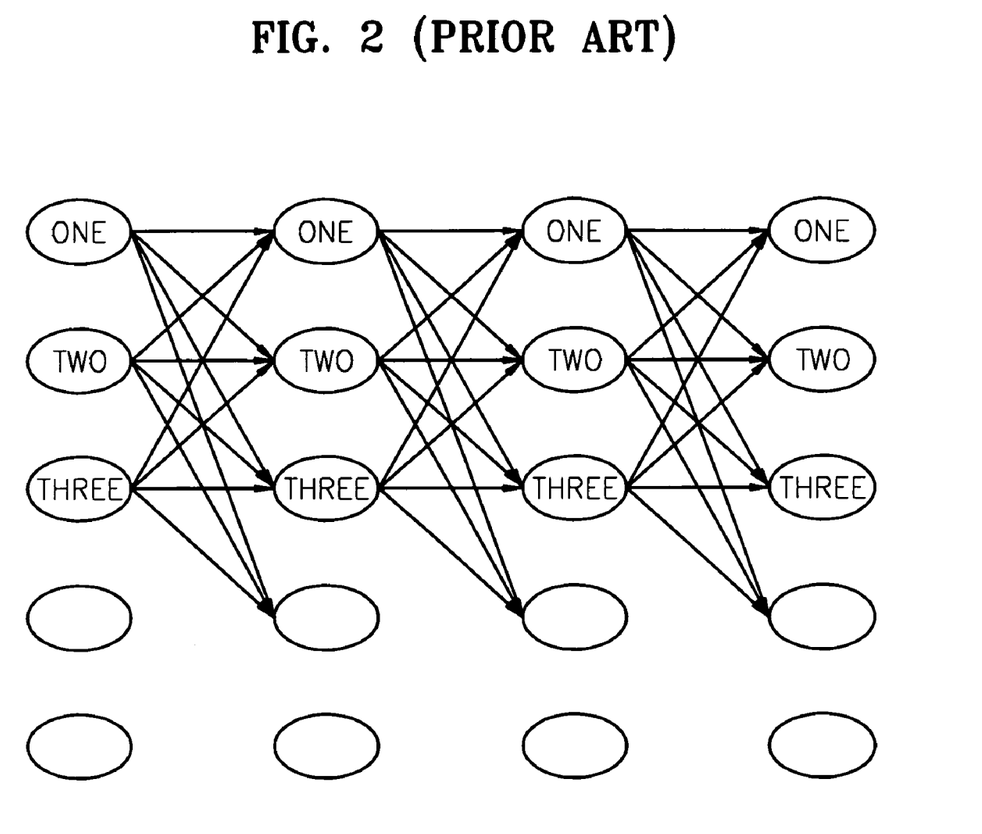
FIG. 2 shows a structure of a feature vector used in the related art voice dialing apparatus.

As illustrated in FIG. 2, in the number mode, the input feature vector is pattern-matched against a number database in order to recognize N digit sounds. Similar to the name mode, a telephone number obtained by voice recognition is then dialed.

Figure 3:
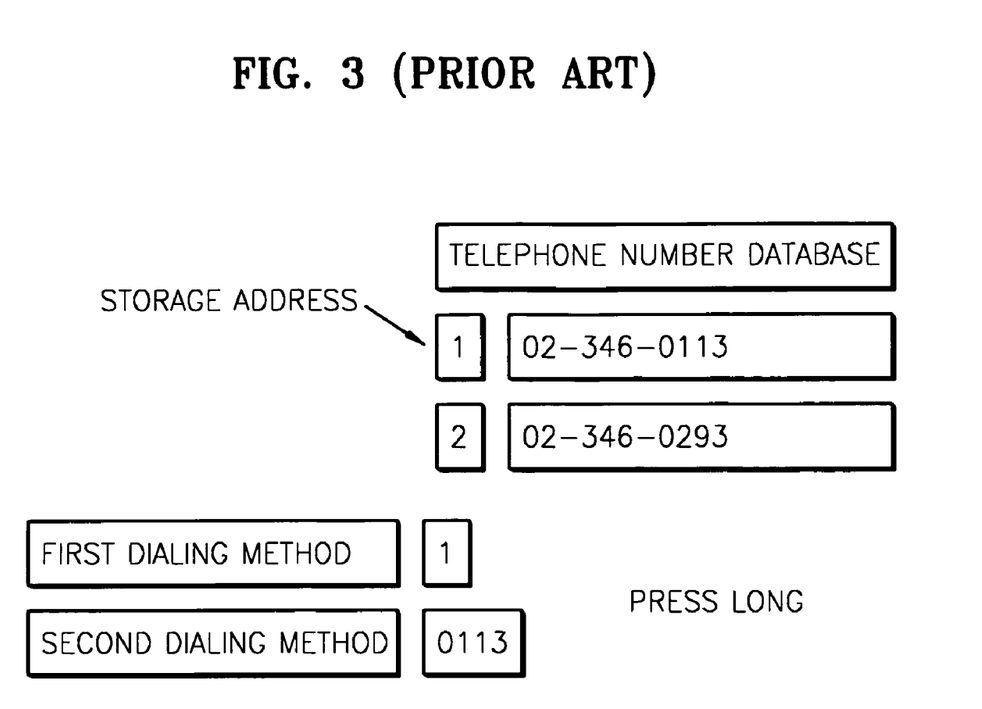
FIG. 3 is a structural diagram of a related art fast dialing method.

FIG. 3 is a structural diagram of a related art fast dialing method. A related art fast dialing method is performed by pressing buttons in two ways. In the first method, the storage address number for a telephone number registered in a telephone number database is pressed. In the second method, four digits at the back among the digits of a telephone number registered in a telephone number database are pressed.

Figure 4:
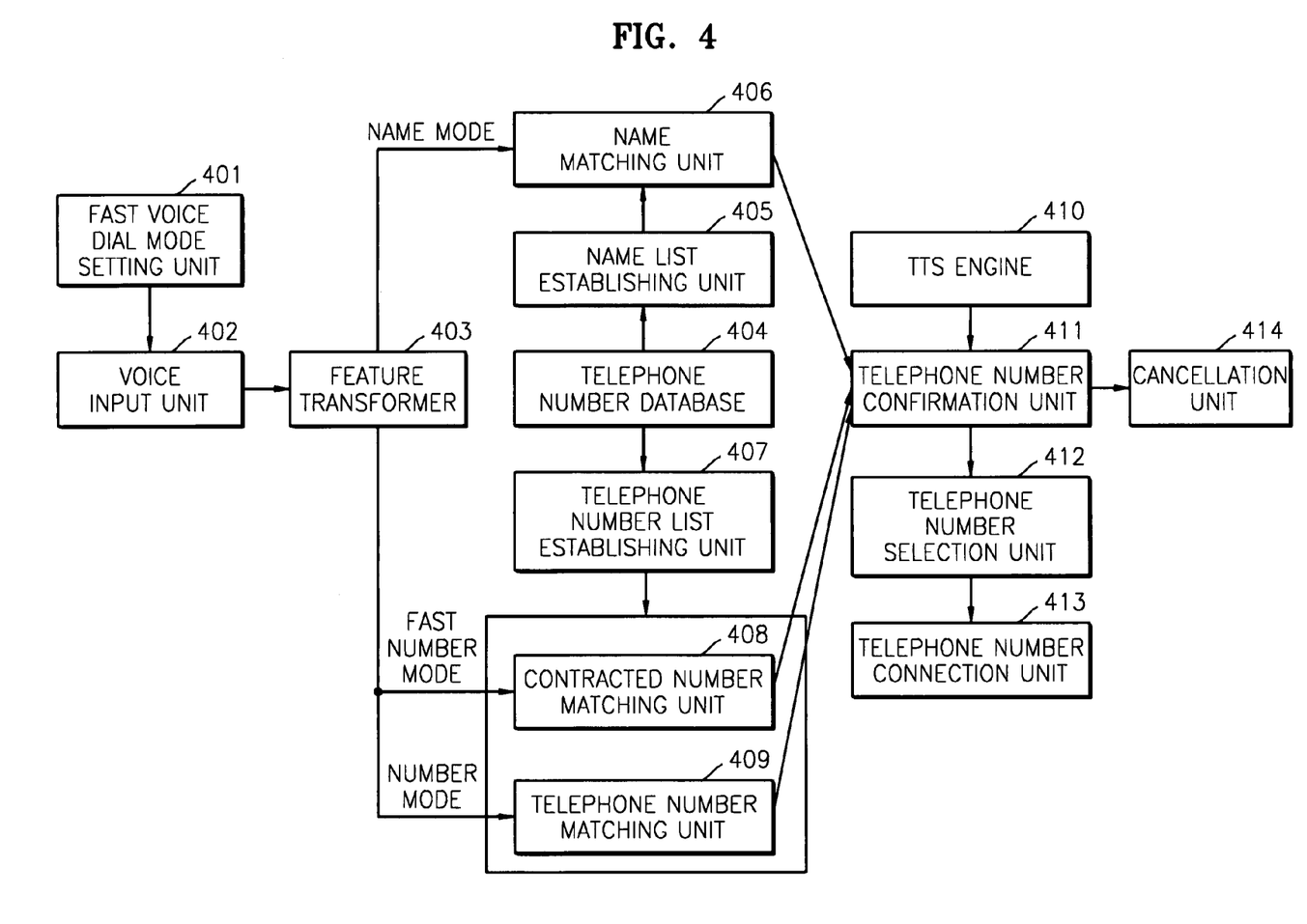
FIG. 4 is a block diagram of an improved voice dialing apparatus having a fast voice dialing apparatus according to an exemplary, non-limiting embodiment of the present invention.

FIG. 4 is a block diagram of an improved voice dialing apparatus including a fast voice dialing apparatus according to the present invention. A fast voice dial mode setting unit 401 sets a fast voice dial mode in response to a voice input by a user or a fast voice mode button. A telephone number list establishing unit 407 obtains the last four digits of a telephone number in a telephone number database 404, determines a list corresponding to the last four digits as a vocabulary to be recognized, and establishes a network.

A feature transformer 403 transforms the input voice from a voice input unit 402 into a feature vector so that the input voice can be used in the process of recognition. A contracted number matching unit 408 matches a mode pattern, which is formed under the established network, with the feature vector.

Using a telephone number confirmation unit 411, the user confirms telephone numbers corresponding to the last 4-digit number. If a plurality of telephone numbers are confirmed in the telephone number confirmation unit 411, a telephone number selection unit 412 selects a telephone number from the plurality of telephone numbers. Then, a telephone number connection unit 413 dials the confirmed or selected telephone number.

If the telephone number confirmation unit 411 confirms that the telephone number obtained as a recognition result is not a telephone number that the user wants to dial, a cancellation unit 414 cancels the recognized telephone number. The name matching unit 406 and the name list establishing unit 405, which are used in the name mode, correspond to the name matching unit 15 of FIG. 1 and the name text database 14 of FIG. 1, respectively. A text to speech (TTS) engine 410 automatically transforms an input text document into a sound. Since an apparatus according to the present invention receives and processes a sound signal, it also outputs a sound signal in consideration of the convenience of users.

Figure 5:
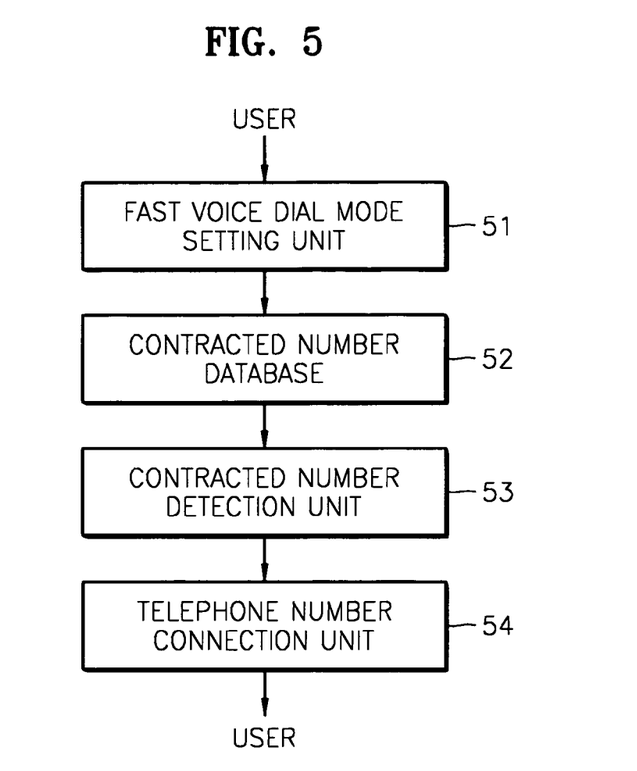
FIG. 5 is a block diagram of a fast voice dialing apparatus according to an exemplary, non-limiting embodiment of the present invention.

FIG. 5 is a block diagram of a fast voice dialing apparatus according to the present invention, which includes a fast voice dial mode setting unit 51, a contracted number database 52, a contracted number detection unit 53, and a telephone number connection unit 54. In response to a fast voice dial mode setting command received from a user, the fast voice dial mode setting unit 51 sets a fast voice dial mode. That is, a fast voice dial mode pre-set by the user is set in the fast voice dial mode setting unit 51. Alternatively, a fast voice dial mode can be set by pressing a button for the fast voice dial mode.

The contracted number database 52 stores and manages telephone numbers used by the user, and establishes a contracted number list that includes contracted numbers extracted from the telephone numbers. Since the fast voice dial mode has already been set, the contracted number database 52 establishes a contracted number database using 4-digit rear numbers that are extracted from a telephone number database and arranged through a network formed with the telephone number database. If the default fast voice dial mode is set in the fast voice dial mode setting unit 51 and the user voices a contracted number, the contracted number detection unit 53 detects the voiced contracted number from the contracted number database.

On the other hand, if the fast voice dial mode is set in the fast voice dial mode setting unit 51 by pressing the button for a fast voice dial mode, the input voice is transformed into PCM data using a codec. Then, the PCM data is changed to a feature used for voice recognition, which is performed by matching the feature with the contracted numbers stored in the contracted number database 52 to find an appropriate number.

The telephone number connection unit 54 connects a telephone number corresponding to the contracted number detected by the contracted number detector 53. The contracted number obtained as a result of the recognition is confirmed by a user and then connected to a telephone number selected by the user. If a telephone number is composed of more than 4 digits, the contracted number is formed of 4 rear digits extracted from the telephone number. On the other hand, if a telephone number is composed of 4 or less digits, the telephone number serves as the contracted number. For example, telephone numbers with less than 4 digits are emergency telephone numbers, such as, 112 or 911. However, if the format of a telephone number changes later, the length of a contracted number for the telephone number can be changed for the sake of convenience of users.

Figure 6:
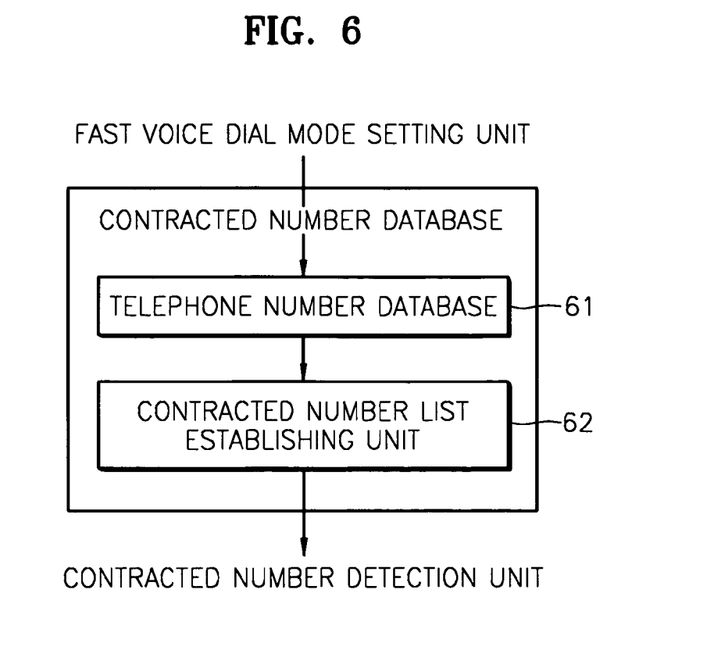
FIG. 6 is a block diagram of a contracted number database included in a fast voice dialing apparatus according to an exemplary, non-limiting embodiment of the present invention.

FIG. 6 is a block diagram showing the structure of the contracted number database 52 in greater detail. The contracted number database 52 includes a telephone number database 61 and a contracted number list establishing unit 62. The telephone number database 61 stores and manages telephone numbers registered by a user and recently dialed telephone numbers. Hence, telephone numbers dialed a substantially long time ago are not stored in the telephone number database if not registered by a user. Generally, telephone numbers recently dialed by a user are indicated as recent call numbers.

The contracted number list establishing unit 62 established a contracted number list of contracted numbers extracted from the telephone numbers stored in the telephone number database 61. If a fast voice dial mode has been pre-set by a user, or if the fast voice dial mode is set by pressing a button for the fast voice dial mode, the fast voice dial mode starts. At the same time, information on the fast voice dial mode is transmitted to the telephone number database 61, and the contracted number list establishing unit 62 makes a recognition target using four rear digits of each of the telephone numbers stored in the telephone number database 61.

Figure 7:
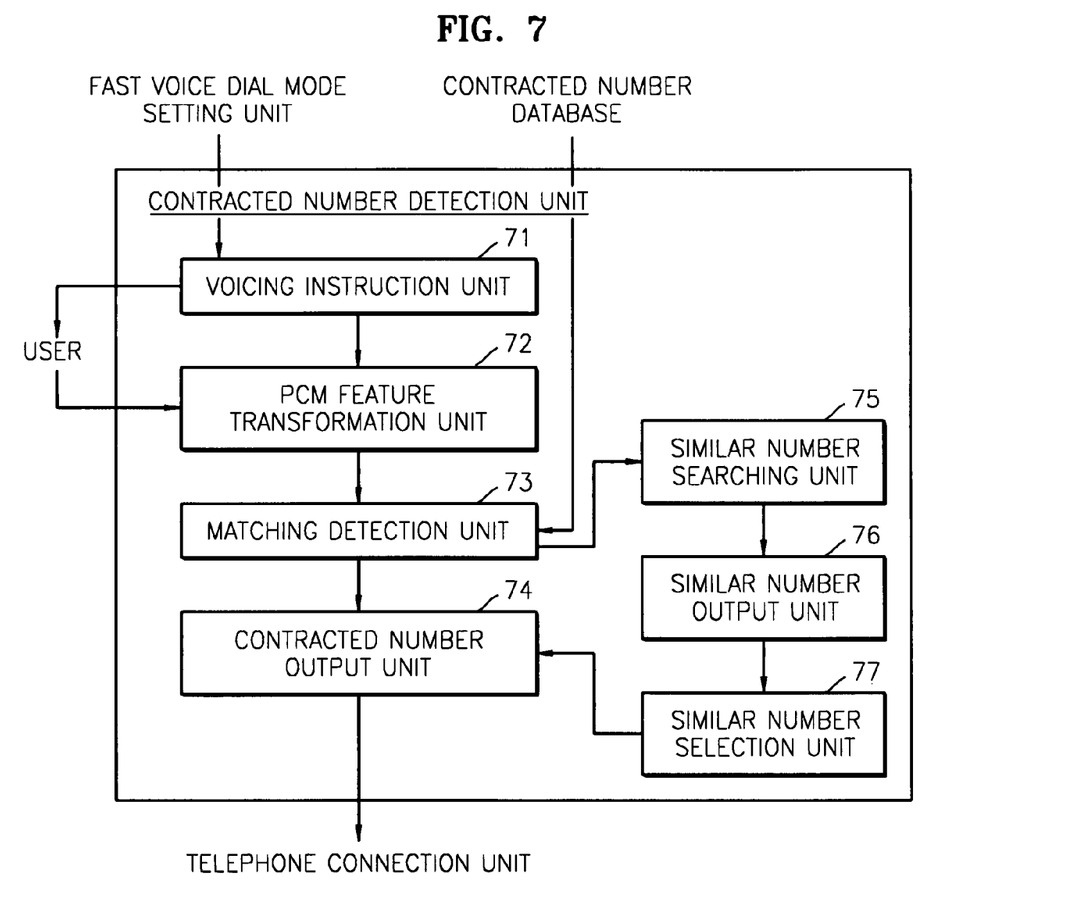
FIG. 7 is a block diagram of a contracted number detection unit included in a fast voice dialing apparatus according to an exemplary, nonlimiting embodiment of the present invention.

FIG. 7 is a block diagram showing the structure of the contracted number detection unit 53 in greater detail. The contracted number detection unit 53 includes a voicing instruction unit 71, a PCM feature transformation unit 72, a matching detection unit 73, and a contracted number output unit 74.

When the fast voice dial mode is set in the fast voice dial mode setting unit 51, the voicing instruction unit 71 instructs a user to voice a contracted number for a telephone number desired by the user. Generally, the instruction is issued through a voice signal via a TTS engine. When the user voices a contracted number in response to the instruction of the voice instruction unit 71, the PCM feature transformation unit 72 transforms the voiced contracted number into PCM data and also transforms the PCM data into a feature. When a user voices four digits according to the guide of a guide message, the four-digit voiced contracted number is transformed into PCM data, and the PCM data is transformed into a feature.

The matching detection unit 73 matches the feature obtained by the PCM feature transformation unit 72 with the contracted numbers included in the contracted number list in the contracted number database 52, and detects a contracted number matching the feature from the contracted number list.

The contracted number output unit 74 outputs the detected contracted number to the user. Generally, the output is also a voice signal output through a TTS engine. If the user listens to the detected contracted number and admits that the contracted number is the same as the contracted number voiced by the user, the user responds (e.g., speaks "yes"). If only one telephone number corresponds to the contracted number detected by the contracted number detection unit 53, the telephone number connection unit 54 connects the detected contracted number to the telephone number corresponding to the detected contracted number.

On the other hand, if a plurality of telephone numbers correspond to the contracted number detected by the contracted number detection unit 53, the plurality of names associated with the respective telephone numbers are voiced through the TTS engine so that the user can listen to the names. Once a user selects a person to call, the telephone connection unit 54 connects the contracted number to the telephone number of the selected person.

If no telephone number corresponds to the contracted number detected by the contracted number detection unit 53, the contracted number output unit 74 requests the user to re-voice the contracted number. When the user re-voices the contracted number, the contracted number detection unit 53 detects the re-voiced contracted number from the contracted number list of the contracted number database 52.

A telephone number connection process after detection of the re-voiced contracted number is the same as described above, except that if no telephone numbers correspond to the re-voiced contracted number detected by the contracted number detection unit 53, an attempt to connect a contracted number similar to the re-voiced contracted number is made for convenience of users. The connection is achieved by a similar number search unit 75, a similar number output unit 76, and a similar number selection unit 77.

The similar number search unit 75 searches for a contracted number similar to the re-voiced contracted number. If similar contracted numbers are found in the similar number search unit 75, the similar number output unit 76 outputs the found similar contracted numbers to the user. The similar number selection unit 77 selects a similar contracted number corresponding to the telephone number desired by the user from the similar contracted numbers output from the similar number output unit 76. On the other hand, if no similar contracted numbers are found, the similar number output unit 76 informs the user of a failure of recognition. In the telephone number connection unit 54, the similar contracted number selected by the similar number selection unit 77 is connected to the telephone number that the user desires.

Figure 8:
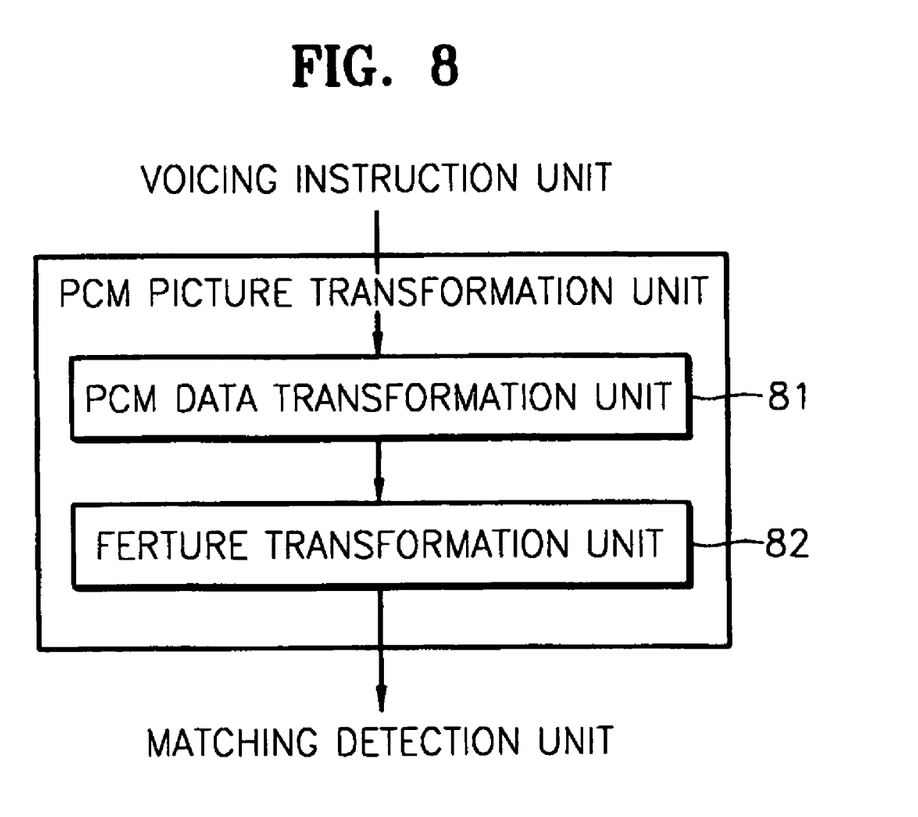
FIG. 8 is a block diagram of a PCM feature transformation unit included in a fast voice dialing apparatus according to an exemplary, nonlimiting embodiment of the present invention.

FIG. 8 is a block diagram showing the PCM feature transformation unit 72 in greater detail, and includes a PCM data transformation unit 81 and a feature transformation unit 82. If a user voices a contracted number in response to the instruction by the voicing instruction unit 71, the PCM data transformation unit 81 transforms the voiced contracted number into PCM data, which is binary digital data, using a codec. The feature transformation unit 82 transforms the PCM data into a feature, which is text data. Matching between the voice and each of the contracted numbers is not performed until the PCM data of the contracted numbers is transformed into text data.

Figure 9:
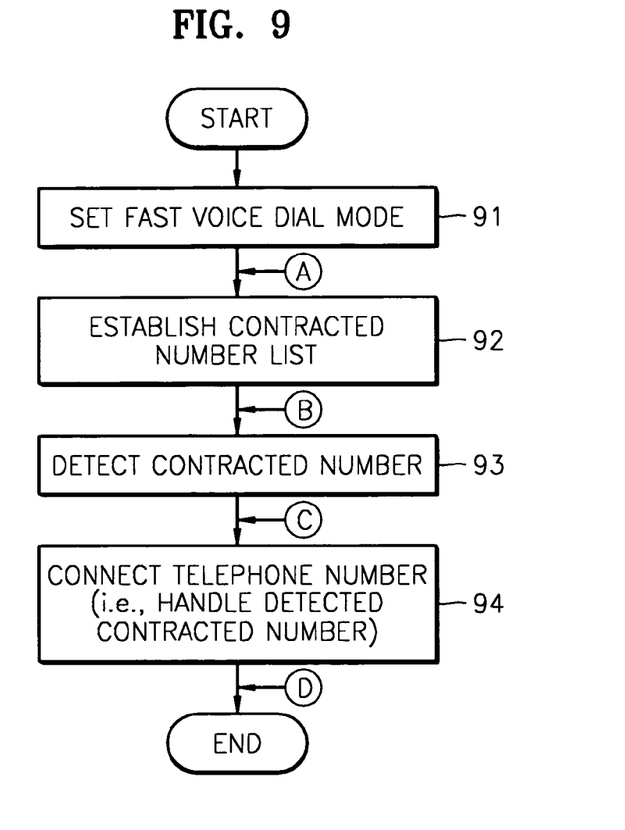
FIG. 9 is a flowchart illustrating a fast voice dialing method according to an exemplary, non-limiting embodiment of the present invention.

FIG. 9 is a flowchart of a fast voice dialing method according to an exemplary, non-limiting embodiment of the present invention. When a fast voice dial mode setting command is received from a user, a fast voice dial mode is set in step S91. In step S92, telephone numbers used by the user are stored and managed, and a contracted number list is established with contracted numbers extracted from the telephone numbers. In step S93, in the fast voice dial mode, if the user voices a contracted number, the voiced contracted number is detected from the contracted number list. In step S94, a telephone number corresponding to the detected contracted number is dialed.

Figure 10:
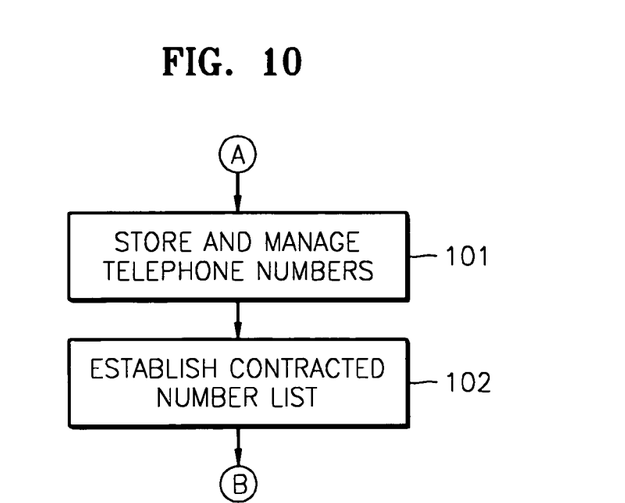
FIG. 10 is a flowchart illustrating in greater detail a contracted number list establishing method included in a fast voice dialing method according to an exemplary, non-limiting embodiment of the present invention.

FIG. 10 is a flowchart illustrating in greater detail a contracted number list establishing step in a fast voice dialing method according to an exemplary, non-limiting embodiment of the present invention. FIG. 10 represents steps performed between A and B of FIG. 9. In step S101, telephone numbers used by a user are stored and managed. In step S102, a contracted number list is established with contracted numbers extracted from the stored telephone numbers.

Figure 11:
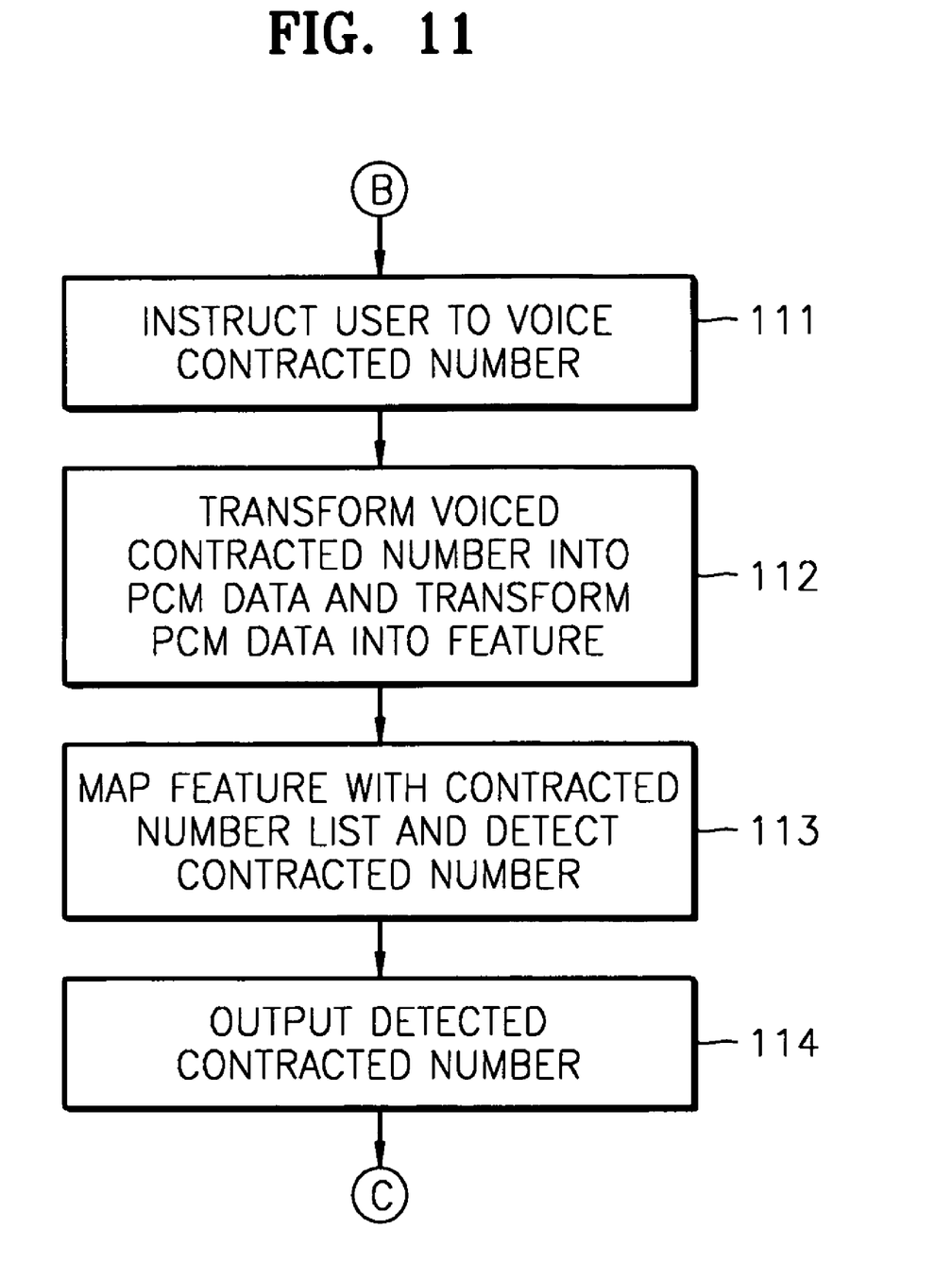
FIG. 11 is a flowchart illustrating in greater detail a contracted number detection method included in a fast voice dialing method according to the an exemplary, non-limiting embodiment of present invention.

FIG. 11 is a flowchart illustrating in greater detail a contracted number detection step in a fast voice dialing method according to according to an exemplary, non-limiting embodiment of the present invention. FIG. 11 represents steps performed between B and C of FIG. 9. In step S111, when the fast voice dial mode is set, a user is instructed to voice a contracted number of a telephone number that the user wants to call. In step S112, when the user voices the contracted number in response to the instruction, the voiced contracted number is transformed into PCM data, which is binary digital data, using a codec, and the PCM data is transformed into text data. In step S113, the feature is matched with the contracted number list, and a contracted number identified with the feature is detected from the contracted number list. In step S114, the detected contracted number is output to the user.

Figure 12:
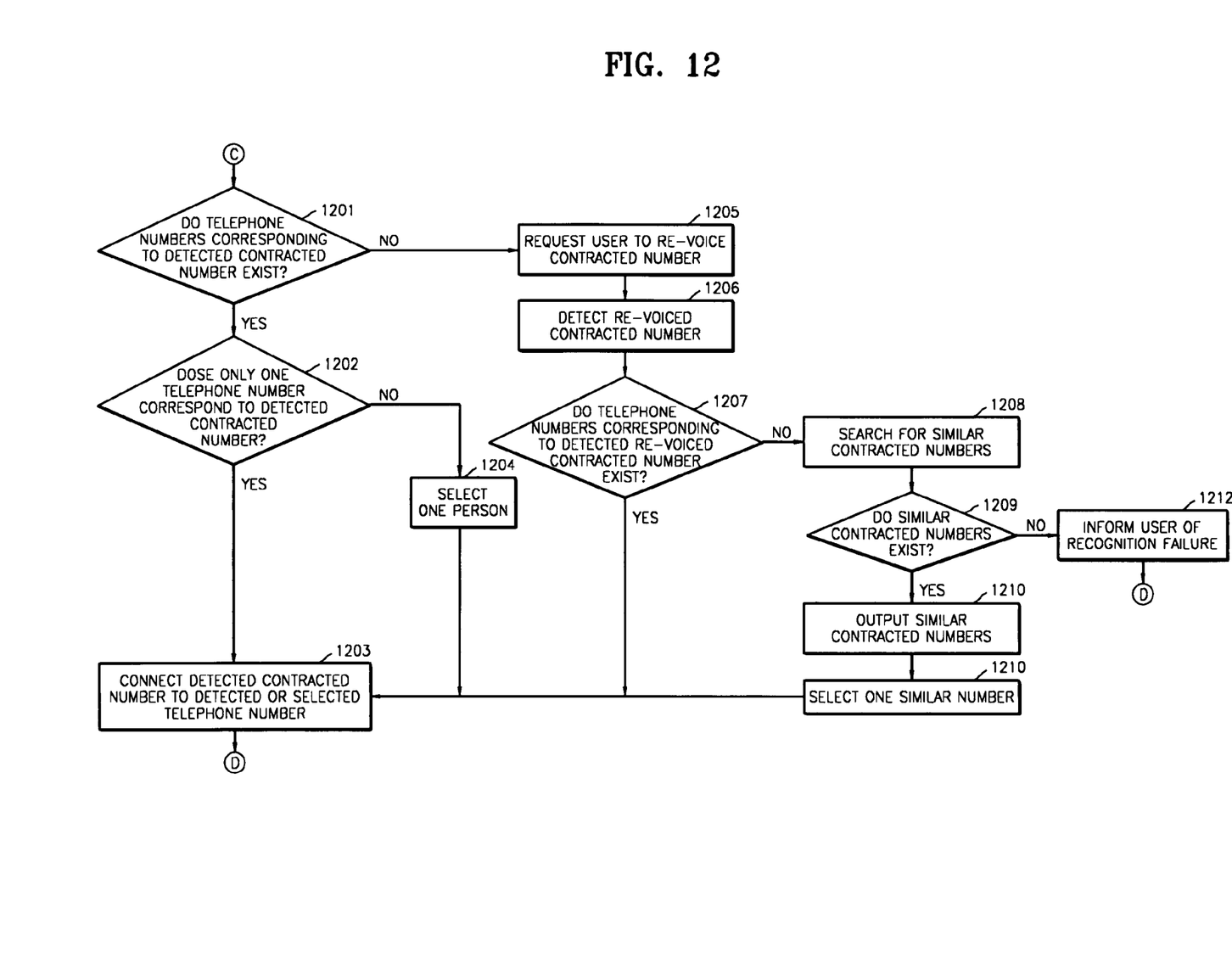
FIG. 12 is a flowchart illustrating in greater detail a detected, contracted number handling method included in a fast voice dialing method according to an exemplary, non-limiting embodiment of the present invention.

FIG. 12 is a flowchart showing in greater detail a detected contracted number list handling step in a fast voice dialing method according to an exemplary, non-limiting embodiment of the present invention. FIG. 12 represents steps performed between C and D of FIG. 9. When telephone numbers corresponding to the detected contracted number exist in step S1201, it is determined whether only one telephone number exists, in step S1202. If only one telephone number exists for the detected contracted number in step S1202, the detected contracted number is connected to the telephone number in step S1203.

On the other hand, when a plurality of telephone numbers exist for the detected contracted number in step S1202, the telephone numbers' possessor names are voiced to the user via a TTS engine, and one person is selected by the user in step S1204. Then, in step S1203, the detected contracted number is connected to the telephone number of the selected person.

If no telephone numbers correspond to the detected contracted number in step S1201, a user re-voices a contracted number in step S1205. In step S1206, the re-voiced contracted number is detected from the contracted number list of a contracted number database. If a telephone number(s) corresponds to the re-voice contracted number in step S1207, the detected contracted number is connected to the telephone number(s), in step S1203. If no telephone numbers corresponding to the re-voiced contracted number exist in step S1207, the contracted number list is searched for contracted numbers similar to the re-voiced contracted number in step S1208.

If similar contracted numbers are found in step S1209, the found similar contracted numbers are output to the user in step S1210. In step S1211, a similar contracted number matched with the telephone number the user desires is selected from the output similar contracted numbers. Thereafter, the method goes to step S1203. On the other hand, if no similar contracted numbers are found in step S1209, the user is informed of a recognition failure, in step S1212.

To sum up, if many people are registered in an arbitrary contracted number, a TTS engine voices a list of registered people so that a user listens to the voiced people' names and selects a person. If a fed-back contracted number is not the same as the contracted number voiced by the user, the user re-voices a contracted number. If a fed-back contracted number is still not the same as the re-voiced contracted number, it is checked whether contracted numbers similar to the fed-back contracted number exist. If similar contracted numbers exist, a list of similar contracted numbers is fed back. If even similar contracted numbers do not exist, a present voicing environment is determined to be inappropriate for voice recognition, and then the user is informed of a recognition failure, and no telephone number is connected.

In an alternate embodiment, when a recognition rate is improved to achieve direct matching with an arbitrary telephone number, the contracted number database is not necessary. A fast voice dialing apparatus having no contracted number database includes a fast voice dial mode setting unit, a contracted number detection unit, and a telephone number connection unit. If a fast voice dial mode setting command is received from a user, the fast voice dial mode setting unit sets a fast voice dial mode. In the fast voice dial mode, if the user voices a contracted number, the contracted number detection unit detects the voiced contracted number from a telephone number list stored in a telephone number database. The telephone number connection unit connects the detected contracted number to a telephone number corresponding to the detected contracted number.

In a fast voice dialing method not using a contracted number database, if a fast voice dial mode setting command is received from a user, a fast voice dial mode is set. In the fast voice dial mode, if the user voices a contracted number, the voiced contracted number is detected from a telephone number list stored in a telephone number database. The detected contracted number is connected to a telephone number corresponding to the detected contracted number.

The embodiments of the present invention can be written as computer programs and can be implemented in general-use digital computers that execute the programs using a computer readable recording medium. Examples of computer readable recording media include magnetic storage media (e.g., ROM, floppy disks, hard disks, etc.), optical recording media (e.g., CD-ROMs, or DVDs), and a storage medium such as a carrier wave (e.g., transmission through the Internet).

The present invention has various advantages. For example, but not by way of limitation, since a user only needs to voice a subset (e.g., the rear four digits) of a telephone number stored in a telephone number directory, telephone numbers having 7 digits or more can be dialed with a better recognition performance at an improved processing speed. Since telephone numbers that users try to call are pre-stored in a telephone number directory, the number of possible combinations of numbers is equal to the number of lists registered in the telephone number directory, and the recognition speed and performance can be improved.

Additionally, since telephone numbers frequently used by users are registered in the telephone number directory in advance, even if only a subset of numbers (e.g., the rear four digits) are voiced, registered telephone numbers with 7 digits or more can be dialed. Thus, a recognition rate, a recognition speed, a telephone call connection speed, and the like, which affect the performance of the entire system are improved. Particularly, users are not inconvenienced even if they have to re-voice four digits when a voice recognition result is wrong due to noise or the like. Thus, the fast voice dialing apparatus can be easily commercialised.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is

1. A fast voice dialing apparatus comprising:
 a fast voice dial mode setting unit that sets a fast voice dial mode in response to a user-generated command for setting a fast voice dial mode;
 a contracted number database that stores and manages a plurality of telephone numbers, establishes a contracted number list using a plurality of contracted numbers extracted from corresponding ones of the telephone numbers, wherein when the fast voice dial mode is set, the contracted number list is newly established at least based on telephone numbers that the user has used after the contracted number list was previously established;
 a contracted number detection unit that detects a contracted number generated by a signal produced by the user from the contracted number list of the contracted number database without attempting to detect the contracted number from the plurality of telephone numbers when the fast voice dial mode is set in the fast voice dial mode setting unit; and
 a telephone number connection unit that connects the detected contracted number to a telephone number corresponding to the detected contracted number.

2. The apparatus of claim 1, wherein when a telephone number has more than a prescribed number of digits, the contracted number is a subset of the telephone number and is extracted from the telephone number, and if a telephone number has less than or equal to the prescribed number of digits, the contracted number is the telephone number.

3. The apparatus of claim 2, wherein said prescribed number of digits is four, and said subset is a four digit rear number extracted from the telephone number.

4. The apparatus of claim 1, wherein the contracted number database comprises
 a telephone number database that stores and manages user-registered telephone numbers and frequently used telephone numbers; and
 a contracted number list establishing unit that establishes a contracted number list using contracted numbers extracted from the telephone numbers stored in the telephone number database.

5. The apparatus of claim 1, wherein the contracted number detection unit comprises
 a voicing instruction unit that instructs a user to voice a contracted number of a desired telephone number when the fast voice dial mode is set;
 a pulse code modulation (PCM) feature transformation unit that transforms the voiced, contracted number into PCM data and transforms the PCM data into a feature when the user voices the contracted number of the desired telephone number;
 a matching detection unit that matches the feature generated by the PCM feature transformation unit with the contracted number list, and detects a contracted number that corresponds to the feature located in the contracted number list; and
 a contracted number output unit that outputs the contracted number detected by the matching detection unit.

6. The apparatus of claim 5, wherein the PCM feature transformation unit comprises:
 a PCM data transformation unit that transforms the voiced contracted number into PCM data when the user voices a contracted number in response to the instruction generated by the voicing instruction unit; and
 a feature transformation unit that transforms the PCM data obtained by the PCM data transformation unit into the feature.

7. The apparatus of claim 6, wherein said PCM data is binary digital data, transformed using a codec, and said feature is text data.

8. The apparatus of claim 1, wherein when only one telephone number corresponds to the contracted number, the telephone number connection unit connects the detected contracted number to the telephone number corresponding to the detected contracted number.

9. The apparatus of claim 1, wherein when more than one of the telephone numbers correspond to the contracted number and a user selects one from the more than one telephone numbers, the telephone number connection unit connects the detected contracted number to the selected telephone number.

10. The apparatus of claim 1, wherein the contracted number detection unit requests the user to re-voice the contracted number when no telephone number corresponds to the detected contracted number, and detects the re-voiced contracted number from the contracted number list.

11. The apparatus of claim 10, wherein the contracted number detection unit comprises:
a similar number searching unit that searches for at least one contracted number similar to the re-voiced contracted number from the contracted number list when no telephone number corresponds to the re-voiced contracted number detected by the contracted number detection unit, wherein said at least one similar number is determined according to a predetermined voice-recognition condition;
a similar number output unit that outputs said at least one similar contracted number to the user if said at least one similar contracted number is found by the similar number searching unit; and
a similar number selection unit that selects one of said at least one similar contracted number that corresponds to the telephone number desired by the user.

12. The apparatus of claim 11, wherein the similar number output unit informs the user of a recognition failure if said at least one similar contracted number is not found by the similar number searching unit.

13. The apparatus of claim 1, wherein the signal is an audio signal.

14. The apparatus of claim 13, wherein the audio signal is a voice.

15. The apparatus of claim 1, further comprising a telephone number confirmation unit which instructs the user to confirm the telephone number.

16. A fast voice dialing method comprising:
setting a fast voice dial mode when a user generates a command for setting a fast voice dial mode;
storing and managing a plurality of telephone numbers used by the user and establishing a contracted number list using a plurality of contracted numbers extracted from the telephone numbers, wherein when the fast voice dial mode is set, the contracted number list is newly established at least based on telephone numbers that the user has used after the contracted number list was previously established;
detecting a user-generated contracted number from the contracted number list without attempting to detect the contracted number from the plurality of telephone numbers when the fast voice dial mode is set; and
connecting the detected contracted number to a telephone number corresponding to the detected contracted number.

17. The method of claim 16, wherein when a telephone number has more than a prescribed number of digits, the contracted number is a subset having a length of the prescribed number of digits extracted from the telephone number, and when a telephone number has a length less than or equal to the prescribed number of digits, the contracted number is the telephone number.

18. The method of claim 17, wherein said prescribed number of digits is four, and said subset is a four digit rear number extracted from the telephone number.

19. The method of claim 16, wherein the contracted number list establishing step comprises:
storing and managing telephone numbers that are at least one of registered and frequently used by a user; and
establishing the contracted number list using the contracted numbers extracted from the stored telephone numbers.

20. The method of claim 16, wherein the detecting step comprises:
instructing the user to input a contracted number of a telephone number that the user wants to call when the fast voice dial mode is set;
when the user inputs a contracted number, transforming the input contracted number into PCM data, and transforming the PCM data into a feature;
matching the feature with the contracted number list and detecting a contracted number corresponding to the feature from the contracted number list; and
outputting the detected contracted number to the user.

21. The method of claim 20, wherein the transforming step comprises
when the user inputs the contracted number in response to the instruction, transforming the voiced contracted number into PCM data; and
transforming the PCM data into the feature.

22. The method of claim 21, wherein said PCM data is binary digital data, transformed using a codec, and said feature is text data.

23. The method of claim 16, wherein in the connecting step, when only one telephone number corresponds to the detected contracted number, the detected contracted number is connected to the corresponding telephone number.

24. The method of claim 16, wherein in the connecting step, when at least two of the telephone numbers correspond to the detected contracted number and a user selects one from the at least two telephone numbers, the detected contracted number is connected to the selected telephone number.

25. The method of claim 16, wherein the connecting step comprises:
requesting the user to re-voice the contracted number when none of the telephone numbers correspond to the detected contracted number, and detecting the re-voiced contracted number from the contracted number list; and
connecting the detected re-voiced contracted number to a telephone number corresponding to the detected re-voiced contracted number.

26. The method of claim 25, wherein the detecting step comprises:
when none of the telephone numbers correspond to the re-voiced contracted number, searching for at least one contracted number similar to the re-voiced contracted number from the contracted number list, wherein said at least one similar number is determined according to a predetermined voice-recognition condition;
when said at least one similar contracted number is found, outputting said at least one similar contracted number to the user;
selecting a similar contracted number that corresponds to a user-selected telephone number from said at least one similar contracted number; and
connecting the detected, re-voiced, contracted number to the telephone number corresponding to the selected similar contracted number.

27. The method of claim 25, wherein the detecting step comprises:
when none of the telephone numbers correspond to the re-voiced contracted number, searching for at least one contracted number similar to the re-voiced contracted number from the contracted number list; and
informing the user of a recognition failure if no similar contracted number is found by said searching, wherein the similar contracted number is determined according to a predetermined voice-recognition condition.

28. The method of claim 16, wherein the user-generated contracted number is voiced by the user.

29. The method of claim 16, further comprising instructing the user to confirm the telephone number before connecting the detected contracted number to the telephone number.

30. A fast voice dialing apparatus comprising:
a fast voice dial mode setting unit that sets a fast voice dial mode when a user generates a command for setting a fast voice dial mode;
a contracted number detection unit that detects a contracted number generated by the user from a telephone number list in a telephone number database when the fast voice dial mode is set in the fast voice dial mode setting unit, wherein when the fast voice dial mode is set, the telephone number list is newly established at least based on telephone numbers that the user has used after the telephone number list was previously established; and
a telephone number connection unit connecting the detected contracted number to a telephone number corresponding to the detected contracted number, wherein said apparatus has no contracted number database.

31. The apparatus of claim 30, wherein when a telephone number has more than a prescribed number of digits, the contracted number is a subset of the telephone number and is extracted from the telephone number, and if a telephone number has less than or equal to the prescribed number of digits, the contracted number is the telephone number.

32. The apparatus of claim 31, wherein said prescribed number of digits is four, and said subset is a four digit rear number extracted from the telephone number.

33. The apparatus of claim 30, wherein the contracted number is voiced by the user.

34. A fast voice dialing method comprising:
setting a fast voice dial mode when a command for a fast voice dial mode to be set is received from a user;
detecting a contracted number voiced by the user from a telephone number list in a telephone number database if the fast voice dial mode is set, wherein when the fast voice dial mode is set, the telephone number list is newly established at least based on telephone numbers that the user has used after the telephone number list was previously established; and
connecting the detected contracted number to a telephone number corresponding to the detected contracted number, wherein a contracted number database is not used.

35. The method of claim 34, wherein when a telephone number has more than a prescribed number of digits, the contracted number is a subset having a length of the prescribed number of digits extracted from the telephone number, and when a telephone number has a length less than or equal to the prescribed number of digits, the contracted number is the telephone number.

36. The method of claim 35, wherein said prescribed number of digits is four, and said subset is a four digit rear number extracted from the telephone number.

37. A computer readable recording medium on which a computer program having a set of instructions for executing fast telephone dialing is provided, said instructions comprising:
setting a fast voice dial mode when a user generates a command for setting a fast voice dial mode;
storing and managing a plurality of telephone numbers used by the user and establishing a contracted number list using a plurality of contracted numbers extracted from the telephone numbers, wherein when the fast voice dial mode is set, the contracted number list is newly established at least based on telephone numbers that the user has used after the contracted number list was previously established;
detecting a user-generated contracted number from the contracted number list without attempting to detect the contracted number from the plurality of telephone numbers when the fast voice dial mode is set; and
connecting the detected contracted number to a telephone number corresponding to the detected contracted number.

38. The computer readable recording medium of claim 37, wherein when a telephone number has more than a prescribed number of digits, the contracted number is a subset having a length of the prescribed number of digits extracted from the telephone number, and when a telephone number has a length less than or equal to the prescribed number of digits, the contracted number is the telephone number.

39. The computer readable recording medium of claim 37, wherein the contracted number list establishing instruction comprises:
storing and managing telephone numbers at least one of registered and frequently used by a user; and
establishing the contracted number list using the contracted numbers extracted from the stored telephone numbers.

40. The computer readable recording medium of claim 37, wherein the detecting instruction comprises:
instructing the user to input a contracted number of a telephone number that the user wants to call when the fast voice dial mode is set;
when the user inputs a contracted number, transforming the input contracted number into PCM data, and transforming the PCM data into a feature;
matching the feature with the contracted number list and detecting a contracted number corresponding to the feature from the contracted number list; and
outputting the detected contracted number to the user.

41. The computer readable recording medium of claim 40, wherein the transforming instruction comprises
when the user inputs the contracted number in response to the instruction, transforming the voiced contracted number into PCM data; and
transforming the PCM data into the feature.

42. The computer readable recording medium of claim 37, wherein in the connecting instruction, when only one telephone number corresponds to the detected contracted number, the detected contracted number is connected to the corresponding telephone number.

43. The computer readable recording medium of claim 37, wherein in the connecting instruction, when at least two of the telephone numbers correspond to the detected contracted number and a user selects one from the at least two telephone numbers, the detected contracted number is connected to the selected telephone number.

44. The computer readable recording medium of claim 37, wherein the connecting instruction comprises:
requesting the user to re-voice the contracted number when none of the telephone numbers correspond to the detected contracted number, and detecting the re-voiced contracted number from the contracted number list; and
connecting the detected re-voiced contracted number to a telephone number corresponding to the detected re-voiced contracted number.

45. The computer readable recording medium of claim 44, wherein the detecting instruction comprises:
when none of the telephone numbers correspond to the re-voiced contracted number, searching for at least one contracted number similar to the re-voiced contracted number from the contracted number list, wherein said at least one similar number is determined according to a predetermined voice-recognition condition;

when said at least one similar contracted number is found, outputting said at least one similar contracted number to the user;

selecting a similar contracted number that corresponds to a user-selected telephone number from said at least one similar contracted number; and connecting the detected, re-voiced, contracted number to the telephone number corresponding to the selected similar contracted number.

46. The computer readable recording medium of claim 44, wherein the detecting instruction comprises:

when none of the telephone numbers correspond to the re-voiced contracted number, searching for at least one contracted number similar to the re-voiced contracted number from the contracted number list; and informing the user of a recognition failure if no similar contracted number is found by said searching, wherein the similar contracted number is determined according to a predetermined voice-recognition condition.

47. A computer readable recording medium on which a computer program having a set of instructions for executing fast telephone dialing is provided, said instructions comprising:

setting a fast voice dial mode when a user generates a command for setting a fast voice dial mode;

detecting a contracted number generated by the user from a telephone number list in a telephone number database when the fast voice dial mode is set, wherein when the fast voice dial mode is set, the telephone number list is newly established at least based on telephone numbers that the user has used after the telephone number list was previously established; and connecting the detected contracted number to a telephone number corresponding to the detected contracted number.

* * * * *